United States Patent [19]

Koomen

[11] Patent Number: 4,524,481
[45] Date of Patent: Jun. 25, 1985

[54] DUAL BLADE WINDSHIELD WIPER

[76] Inventor: Pieter C. Koomen, 132 W. Surrey, Phoenix, Ariz. 85029

[21] Appl. No.: 555,585

[22] Filed: Nov. 28, 1983

[51] Int. Cl.³ .............................................. B60S 1/38
[52] U.S. Cl. ................................................ 15/250.41
[58] Field of Search ........................ 15/250.36–250.42

[56]  References Cited
U.S. PATENT DOCUMENTS

| | | | |
|---|---|---|---|
| 2,011,015 | 8/1935 | Schleicher | 15/250.4 |
| 2,063,375 | 12/1936 | Harvey et al. | 15/250.41 X |
| 3,116,510 | 1/1964 | Oishei et al. | 15/250.4 X |
| 3,636,583 | 1/1972 | Rosen | 15/250.41 |

FOREIGN PATENT DOCUMENTS 461560  2/1937  United Kingdom ............. 15/250.41

Primary Examiner—Peter Feldman
Attorney, Agent, or Firm—Cahill, Sutton & Thomas

[57] ABSTRACT

A flexible wiper, having a body portion supporting a pair of opposed longitudinal slots for engaging a harness of a wiper arm, includes a pair of parallel spaced apart blades depending from the body portion for operating in concert to wipe a surface. A cavity extending throughout the body portion is disposed intermediate the pair of blades and is defined in part by a flexible membrane interconnecting facing sides at the bases of the blades.

12 Claims, 11 Drawing Figures

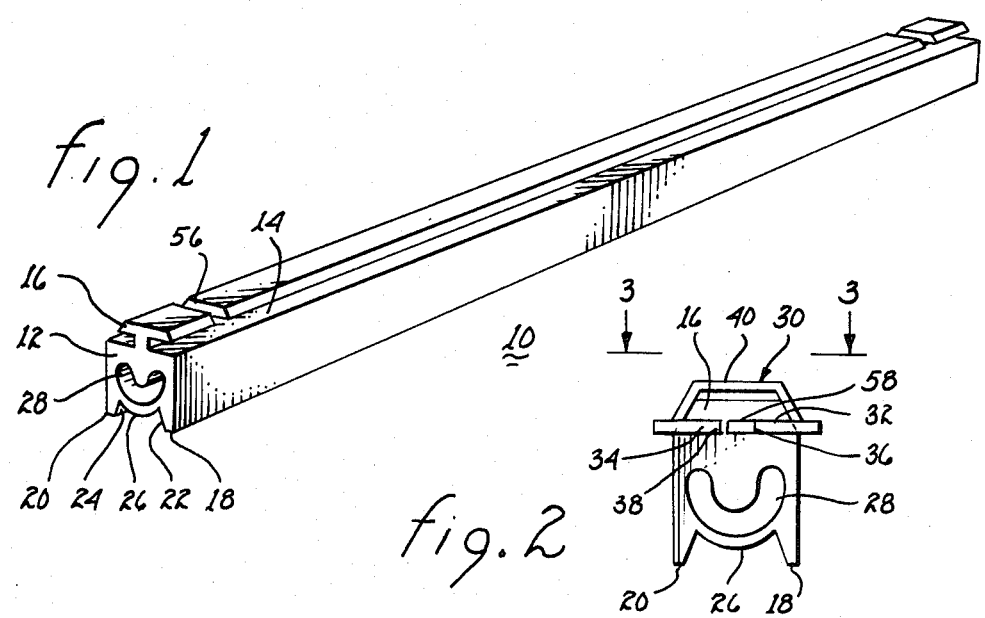
fig. 1
fig. 2
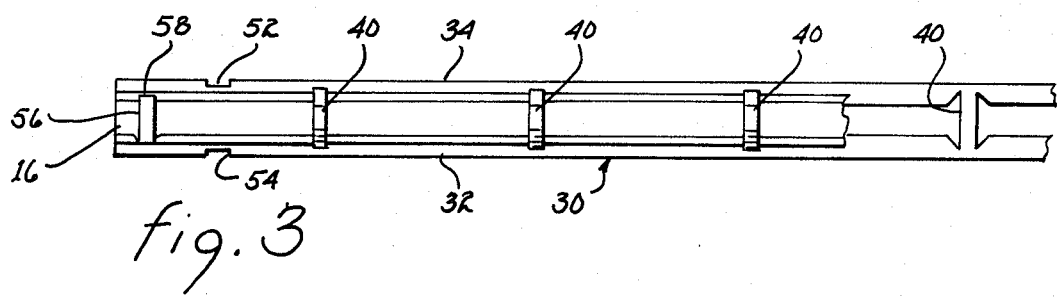
fig. 3
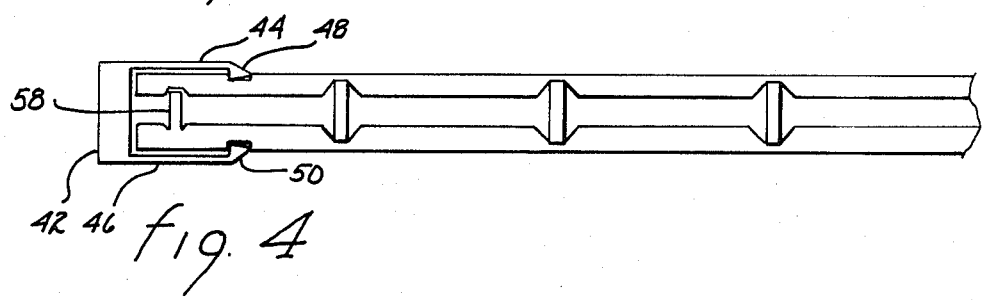
fig. 4
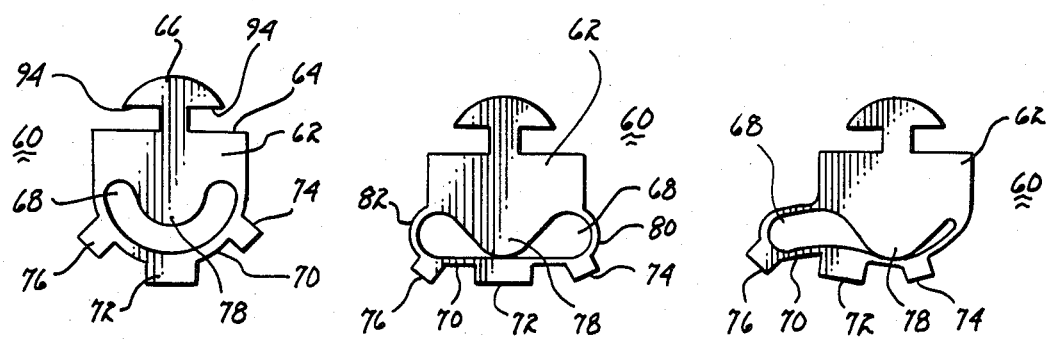
fig. 5  fig. 6  fig. 7

DUAL BLADE WINDSHIELD WIPER

The present invention relates to wiping devices and, more particularly, to wipers for automotive windshields and the like.

Most modern day automobiles have single and sometimes compound curvature windshields. To wipe such a surface free of rain water or snow during periods of inclement weather is a relatively complex problem. The oscillating wiper arm is usually biased by a spring or the like against the windshield. The force is translated through an interconnecting harness to the wiper in contact with the windshield. Substantial engineering work has been done on harnesses to distribute the force provided by the wiper arm along the length of the wiper to permit the wiper to continuously conform to a varying curvature surface during oscillatory movement of the wiper arm. However, the force distribution provided by the harness is at best an approximation in uniformity as other disruptive forces exist. In example, during movement of the vehicle or under windy conditions, a different wind force acts upon the wiper depending upon its horizontal and vertical position on the windshield. These wind forces are not constant and completely effective compensatory forces to be exerted by the harness cannot be obtained. It is therefore mandatory that the structure of the wiper itself be capable of altering its configuration with respect to the degree of force applied at each point along the wiper in order to obtain the most effective possible wiping action.

Presently widely used windshield wipers have a single blade tapering in cross-section toward the windshield, which taper permits bending or curling of the terminal edge proportional to the force applied resulting in a reasonably uniform distribution of forces along the wiper. However, the bent or curled parts of the wiper blade tend to reduce the effectiveness of the wiping action and streaking often results.

Various developments have been made to increase the effectiveness of wipers for automotive windshields and the like. U.S. Pat. No. 4,327,457 describes a pair of parallel blades extending from a common base and having a cylindrical or semi-cylindrical member disposed therebetween to provide a scrubbing action which, in combination with the wiping action of the two blades, may provide effective wiping of a surface. U.S. Pat. No. 3,056,691 describes a wiper having a pair of spaced apart blades depending from a common base; vent holes extending through the base prevent build up of an above ambient air pressure within the cavity defined by the surface being wiped, the two blades and the base. U.S. Pat. No. 2,063,375 is directed to a rigid U-shaped holder for retainingly engaging the sides of a U-shaped wiper. The central portion of the wiper intermediate the sides is laterally deflectable in response to the force applied by the wiper arm, the degree of friction between the engaged surface of the wiper and the surface being cleaned and the degree of flexibility of the sides in order to apply a more uniform pressure along the length of the wiper. U.S. Pat. No. 4,293,975 describes a wiper having a pair of diverging blades extending from a base. U.S. Pat. No. 4,138,759 illustrates a wiper having a pair of adjacent blades joined at opposed extremities of the blade edges but the edges are segregably free of one another therebetween. U.S. Pat. No. 2,080,129 discloses a pair of parallel wiper blades disposed on opposed sides of a slotted strip. U.S. Pat. No. 4,057,870 illustrates and describes a wiper having a central blade of substantial depth bracketed by a plurality of lesser depth blades. U.S. Pat. No. 3,224,027 describes a pair of segregated mirror image blades retained functionally adjacent one another by a supoorting harness. U.S. Pat. No. 4,317,251 is directed to three independent blades retained by a harness in fixed relationship with one another to provide several differently configured wiping surfaces.

A wiper for automobile windshields must meet several criteria to be practical. First, relatively effective wiping of rain, snow and wetted debris must be accomplished. Second, deterioration of effectiveness of a wiper due to sunlight and other natural causes usually limits the useful life of a wiper long before the wiper is worn out; thus, the wiper must be relatively inexpensive to replace. Third, replacement should be as easy and convenient as possible to encourage replacement without incurring labor costs of skilled mechanics.

A wiper constructed in accordance with the present invention includes a base portion having a pair of opposed slots disposed therein for receiving engaging elements of a wiper harness attachable to a wiper arm. A pair of parallel blades for contacting the surface to be wiped extend in spaced relationship to one another from the base portion. A cavity, preferably kidney-shaped, extends longitudinally throughout the wiper adjacent the base portion and between the bases of the blades to define in part a thin membrane interconnecting the facing sides of the blades. In a variant of the invention, a central and two sharp edged rectangular in cross-section ribs extend from the membrane. A further embodiment is formed by a U-shaped membrane having a central longitudinal section from which extend outwardly a central and two bracketing ribs. The upper sides of the U-shaped membrane are attached to a base, which base rotatably supports a longitudinally extending roller serving as a force translation element to the center section of the membrane while accommodating reciprocal lateral displacement of the membrane center section during operation of the wiper.

It is therefore a primary object of the present invention to provide a wiper having a pair of parallel blades operating in concert to perform a wiping action.

Another object of the present invention is to provide a dual bladed wiper havinq a cavity disposed intermediate the blades for regulating the wiping action of the blades.

Yet another object of the present invention is to provide a wiper having a pair of parallel blades extending from a common base and interconnected with one another at a point removed from the base by a flexible membrane.

Still another object of the present invention is to provide a dual blade wiper detachably attachable to a conventional wiper arm harness.

A further object of the present invention is to provide a wiper having a plurality of ribs depending from a flexible membrane for wiping a surface.

A yet further object of the present invention is to provide a plurality of membrane supported sharp edged wiping elements laterally displaceable by flexing of the membrane during oscillatory wiping of a surface.

A still further object of the present invention is to provide a wiper having a roller to bear against a multiwiping element supporting membrane to facilitate lateral displacement of the membrane in response to reciprocating motion of the wiper across a surface.

These and other objects of the invention will become apparent to those skilled in the art as the description of the invention proceeds.

The present invention will be described with greater specificity and clarity with reference to the drawings, in which:

FIG. 1 is a perspective view of the wiper;

FIG. 2 is an end view of the wiper secured to a harness;

FIG. 3 is a top view taken along lines 3—3, as shown in FIG. 2;

FIG. 4 illustrates a lock for maintaining the harness secured to the wiper;

FIG. 5 illustrates a first variant;

FIGS. 6 and 7 illustrate operation of the first variant;

Figure 8:
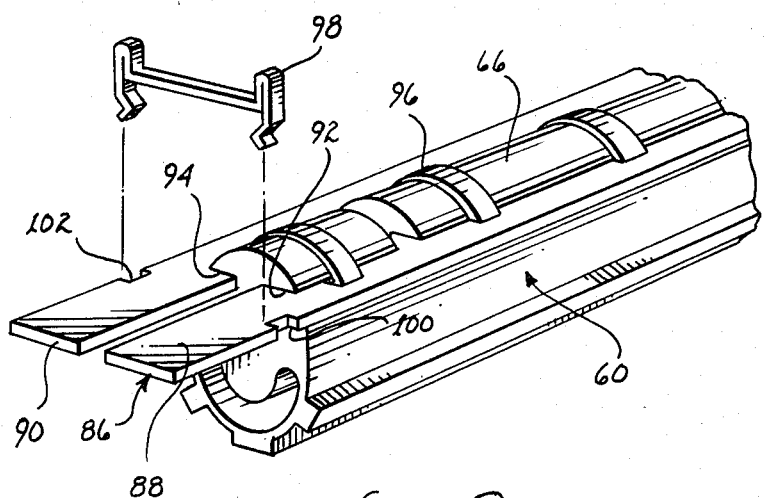
FIG. 8 illustrates a harness for the first variant.

Referring to FIG. 1, there is shown a wiper 10 particularly adapted, in the configuration illustrated, to serve as the operative element for an automotive windshield wiper system. It is to be understood that the configuration may be adapted for use in the manner of a squeegee or other tool useful for wiping fluids from surfaces.

The wiper includes a body portion 12 having a generally planar bifurcated upper surface 14. A retaining element 16 extends upwardly from surface 14 along the length of the wiper. The retaining element is configured in cross-section as a T-section. A pair of blades 18, 20 depend from body portion 12 in spaced apart relationship to one another. Facing surfaces 22, 24 of blades 18, 20, respectively, are interconnected at their bases by a flexible membrane 26. A cavity 28 is developed within the wiper by the body portion and the membrane and extends throughout the length of wiper 10. Preferably, the cross-section of cavity 28 is kidney shaped with the concave surface being generally defined by membrane 26 and the convex surface being generally defined by body portion 12. As illustrated, blades 18 and 20 are generally lateral of the lateral extremities of the cavity.

FIG. 2 illustrates in further detail various of the structural relationships described above. It may be noted that cavity 28 is depicted more as a "U" shape than a kidney shape; it is to be understood that the exact configuration is a function of the size of wiper 10, the elasticity, flexibility and the deformability of the material of which the wiper is formed as well as the ultimate use for which the configuration is developed.

A harness 30 is adapted to slidingly receive and engage retaining element 16. To effect this purpose, the harness includes a pair of inwardly extending flanges 32, 34 for sliding engagement with opposed slots 36, 38 defined by the retaining element and surface 14.

As illustrated in FIGS. 3 and 4, harness 30 may be developed by flanges 32, 34 periodically interconnected with cross-members 40 bridging the top of retaining element 16. Suitable means may be employed to secure harness 30 to a conventional oscillating wiper arm mounted on an automobile. To retain wiper 10 within harness 30, a tab 58 extends from flange 32 and is bent to engage slot 56. A key lock 42 for retaining the harness locked to a wiper arm includes a pair of spring arms 44, 46 having enlarged ends 48, 50. The enlarged ends interconnect with indents 52, 54 in harness 30 to prevent the wiper arm elements from sliding off the harness.

In summary, through experimentation it has been learned that the employment of dual blades 18, 20 depending from opposed sides of a kidney shaped, U-shaped or modified U-shaped cavity 28 and interconnected with a membrane 26, which membrane defines a part of the cavity, provides wiping action superior to a single blade or otherwise configured multiblade wipers.

Referring to FIG. 5, there is shown a variant 60 of the wiper. Body portion 62 includes a top planar surface 64 bifurcated by the stem of a retaining element 66 being a modified T-section in cross-section. A kidney or U-shaped cavity 68 has its convex surface generally defined by body portion 62. A membrane 70 depends downwardly from the body portion and generally defines the concave surface of cavity 68. A central rib 72 of generally rectangular cross-section depends from the central section of membrane 70 and extends longitudinally along variant 60. Lateral ribs 74, 76, each of generally rectangular cross-section, extend longitudinally parallel with rib 72 along membrane 70. For reasons to be described below, the longitudinal edges of each of the three ribs are preferably sharp cornered.

Referring jointly to FIGS. 6 and 7, the operation of variant 60 will be described. Upon placing variant 60 adjacent a surface to be wiped, the central section of cavity 68 will collapse proportional to the force applied against body portion 62. Usually, the force is sufficient to bring rounded ridge 78 into contact with membrane 70 adjacent rib 72, as illustrated. In this configuration, the ridge exerts a force directly upon rib 72. In addition, the resulting bent sides 80, 82 of membrane 70 will exert a force upon ribs 74, 76 to urge them toward the surface being wiped.

Upon lateral movement of variant 60, as shown in FIG. 7, frictional contact intermediate the surface being wiped and the contacting ribs will tend to skew membrane 70 laterally. Such lateral skewing, in combination with the pressure being applied by variant 60 and the resilience of the membrane will tend to rotate one or more of ribs 72, 74 and 76 to bring the longitudinal edge or edges thereof into wiping contact with the surface. Such contact will be through a relatively restricted surface area and hence raise the pressure (pounds per square inch) at the point of contact. The resulting high pressure at the point of contact will tend to provide a more complete wiping action to remove any fluid material from the surface being wiped than a longer surface area subjected to the same force.

When variant 60 is urged in the direction opposite that shown in FIG. 7, membrane 70 will translate laterally with respect to body portion 62 and bring different edges and parts of ribs 72, 74 and 76 into contact with the surface being wiped. In essence, the configuration would be like a mirror image of the configuration shown in FIG. 7.

Figure 9:
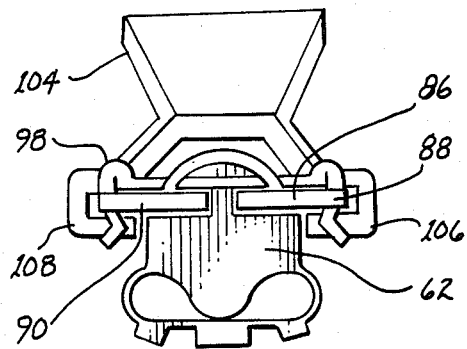
FIG. 9 illustrates operation of the variant on attachment to a wiper arm.

Referring jointly to FIGS. 8 and 9, a means for detachably attaching variant 60 is illustrated. A harness 86 is formed by flanges 88, 90 for sliding engagement with slots 92, 94 developed by surface 64 and retaining element 66 (see FIG. 5). The flanges are joined to one another by a plurality of curved cross-members 96 generally conforming to the upper curved surface of retaining element 66. A clip 98 removeably engages opposed indentations 100, 102 in flanges 88, 90 to preclude longitudinal sliding of variant 60 with respect to harness 86. The clip may also be employed to secure a wiper arm to harness 86, as shown in FIG. 9. A pair of claws 106, 108 engage opposed edges of flanges 88, 90. Sliding movement of the claws along harness 86 is precluded by a clip disposed on either side of the claws engaging suitable indentations in the harness or by a clip 98 and the terminal end of retaining element 66, as illustrated.

Figure 10:
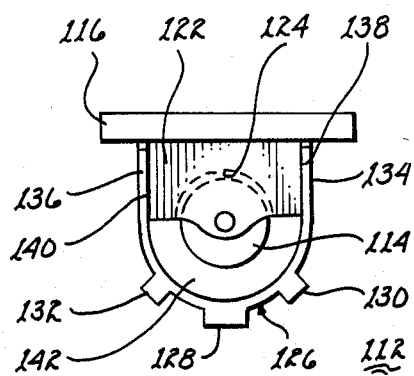
FIG. 10 illustrates a second variant.
Figure 11:
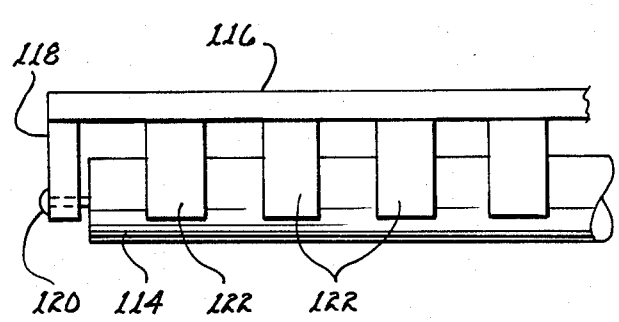
FIG. 11 illustrates a side view of a portion of the second variant.

Referring jointly to FIGS. 10 and 11, there is shown a further variant 112. When variant 60 is in operation, substantial sliding contact between ridge 78 and the concave surface of cavity 68 may produce an unacceptable wear rate, depending upon the forces applied and materials used. To avoid or reduce the wear rate, a roller 114, as embodied in further variant 112 may be employed. Body portion 116 includes a support 118 depending at each of opposed ends of roller 114 for rotatably supporting the roller through pin means 120 or the like. A plurality of cross-plates 122 depend from body portion 116. A curved depression 124 is developed within each cross-plate to preclude interference between roller 114 and the cross-plates.

A flexible membrane 126 is developed with a central rib 128 and opposed lateral ribs 130, 132. Each of the ribs extends parallel with the other ribs for essentially the full length of the membrane and the ribs may be generally rectangular in cross-section, as illustrated. sides 134, 136 of membrane 126 are adhered to planar side surfaces 138, 140 of each of cross-plates 122. On attachment membrane 126, a cavity 142 is developed between the inner surface of the membrane and roller 114.

A suitably configured harness for engaging body portion 116 may be used to removeably secure further variant 112 to the harness and the harness to the wiper arm.

In operation, further variant 112 functions in the manner illustrated in FIGS. 6 and 7 with respect to variant 60. However, repetitive lateral displacement of the membrane, when in contact with roller 114 due to the force imposed upon the further variant will tend to provide very low friction contact. The lack of meaningful frictional contact will tend to inhibit failure of further variant 112 due to wear on the inner surface of the membrane. Further variant 112, when used as a wiper for windshields, must flex to conform with the contour of the surface being wiped. Accordingly, the various elements must be flexible and sufficient clearance between moving parts must be established to prevent interference during flexing.

From the above description, it is evident that wiper 10 and variant 60 are readily manufacturable through conventional extrusion techniques. Accordingly, the manufacturing costs per unit are maintainable very low and commercially competitive with existing products. By appropriate configuration of the respective body portions, presently available harnesses may be employed or new harnesses may be readily developed for costs no greater than conventional harnesses now being employed. One must therefore come to the inescapable conclusion that the configuration of the present invention in the form of wiper 10 or variant 60 is no more expensive than existing products and yet its performance capability is subtantially superior.

Further variant 112 is more complex than wiper 10 or variant 60. Such complexity necessarily increases its cost of manufacture. However, the long life expectancy of further variant 112 over that of other products in combination with its operational advantages may render it eminently suitable for applications where replacement is difficult or can only be made at substantial time intervals.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A flexible wiper attachable to a harness for wiping fluids from a surface, said wiper comprising in combination:
    (a) a flexible body portion;
    (b) a flexible U-shaped membrane formed as part of said body portion and having a pair of opposed sides depending from said body portion and a base section interconnecting said depending opposed sides;
    (c) a central rib and two lateral ribs bracketing said central rib formed as part of and extending from said base section; and
    (d) means formed as part of and depending from said body portion intermediate said opposed sides for exerting a force directly upon said base section during operation of said wiper.

2. The wiper as set forth in claim 1 including a kidney shaped cavity having the concave portion thereof defined by said exerting means and the convex portion thereof defined by said membrane.

3. The wiper as set forth in claim 2 wherein said exerting means comprises a ridge extending toward said membrane.

4. The wiper as set forth in claim 3 wherein said central rib is rectangular in cross-section.

5. The wiper as set forth in claim 4 wherein each of said lateral ribs is rectangular in cross-section.

6. The wiper as set forth in claim 2 wherein said wiper is a monolithic unit.

7. A wiper for wiping fluids from a surface, said wiper comprising in combination:
    (a) a body portion;
    (b) a U-shaped membrane having a pair of opposed sides depending from said body portion and a base section interconnecting said depending opposed sides;
    (c) a central rib and two lateral ribs braketing said central rib extending from said base section; and
    (d) means depending from said body portion intermediate said opposed sides for exerting a force directly upon said base section during operation of said wiper, said exerting means comprising a roller.

8. The wiper as set forth in claim 7 including a plurality of cross-plates depending from and forming a part of said body portion for attachingly receiving said pair of opposed sides.

9. The wiper as set forth in claim 8 including means for rotatably supporting said roller.

10. The wiper as set forth in claim 7 wherein said central rib is rectangular in cross-section.

11. The wiper as set forth in claim 10 wherein each of said lateral ribs are rectangular in cross-section.

12. The wiper as set forth in claim 8 wherein the elements of said wiper are of flexible material for permitting flexing of said wiper to accommodate the curvature of the surface wiped.

* * * * *